(12) United States Patent
Shibuki et al.

(10) Patent No.: US 9,481,596 B2
(45) Date of Patent: Nov. 1, 2016

(54) OPTICAL ELEMENT MANUFACTURING METHOD AND OPTICAL ELEMENT MANUFACTURING APPARATUS

(71) Applicant: Olympus Corporation, Tokyo (JP)

(72) Inventors: Hiroyuki Shibuki, Tokyo (JP); Hiroyuki Seki, Tokyo (JP)

(73) Assignee: Olympus Corporation, Hachioji-shi, Tokyo (JP)

( * ) Notice: Subject to any disclaimer, the term of this patent is extended or adjusted under 35 U.S.C. 154(b) by 570 days.

(21) Appl. No.: 13/712,149

(22) Filed: Dec. 12, 2012

(65) Prior Publication Data

US 2013/0098114 A1    Apr. 25, 2013

Related U.S. Application Data

(63) Continuation of application No. PCT/JP2011/056882, filed on Mar. 23, 2011.

(30) Foreign Application Priority Data

Jun. 29, 2010   (JP) .................................. 2010-147308

(51) Int. Cl.
   *C03B 23/00*   (2006.01)
   *C03B 11/12*   (2006.01)
   *C03B 11/16*   (2006.01)

(52) U.S. Cl.
   CPC ............. *C03B 11/122* (2013.01); *C03B 11/16* (2013.01); *C03B 23/0013* (2013.01); *C03B 2215/66* (2013.01); *C03B 2215/69* (2013.01); *C03B 2215/72* (2013.01)

(58) Field of Classification Search
   CPC ........................ C03B 2215/66; C03B 2215/69
   See application file for complete search history.

(56) References Cited

U.S. PATENT DOCUMENTS

| 5,616,161 | A  | * | 4/1997 | Morikita ................. C03B 11/08 425/407 |
| 2005/0178157 | A1 | * | 8/2005 | Yoneda .......................... 65/32.1 |
| 2005/0235699 | A1 | * | 10/2005 | Fukuyama ............ C03B 11/005 65/158 |

(Continued)

FOREIGN PATENT DOCUMENTS

| JP | 4-367526 A | 12/1992 |
| JP | 10-251031 | 9/1998 |
| JP | 2002-114529 A | 4/2002 |

(Continued)

OTHER PUBLICATIONS

Office Action for corresponding Chinese Patent Application No. 201180029548.3 issued Aug. 4, 2014.

(Continued)

*Primary Examiner* — Jason L Lazorcik
*Assistant Examiner* — Cynthia Szewczyk
(74) *Attorney, Agent, or Firm* — Arent Fox LLP (57) ABSTRACT

The present invention provides an optical element manufacturing method including a first step of fixing an optical material by exerting a first weight different from a self weight of an upper die on the optical material positioned in a cavity between the upper die and a lower die, a second step of thereafter heating and softening the optical material by introducing a heated gas to an inside of the cavity, and a third step of thereafter molding an optical element by exerting a second weight larger than the first weight on the optical material within the cavity.

4 Claims, 11 Drawing Sheets

(56) References Cited

U.S. PATENT DOCUMENTS

2006/0107695 A1* 5/2006 Chen .................... C03B 11/122
  65/29.19
2010/0000258 A1* 1/2010 Jeng et al. ...................... 65/102

FOREIGN PATENT DOCUMENTS

| JP | 2008-120645 A | 5/2008 |
| JP | 2010-013349 A | 1/2010 |

OTHER PUBLICATIONS

Office Action for corresponding Chinese Patent Application No. 201180029548.3 issued Aug. 2014.
International Search Report issued for PCT/JP2011/056882, date of mailing Jun. 28, 2011.
English computer generated translation JP 2008-120645.
Japanese Office Action mail date Apr. 28, 2015, issued for corresponding application JP 2012-522482 (Partial English translation thereof).

* cited by examiner

OPTICAL ELEMENT MANUFACTURING METHOD AND OPTICAL ELEMENT MANUFACTURING APPARATUS

CROSS-REFERENCE TO RELATED APPLICATION

This is a continuation application of PCT application No. PCT/JP2011/056882, filed on Mar. 23, 2011, which was not published under PCT Article 21(2) in English.

This application is based upon and claims the benefit of priority from prior Japanese Patent Application No. 2010-147308, filed on Jun. 29, 2010, the entire contents of which are incorporated herein by this reference.

BACKGROUND OF THE INVENTION

1. Field of the Invention

The present invention relates to an optical element manufacturing method and an optical element manufacturing apparatus.

2. Description of the Related Art

A technique of molding an optical element in a desired shape by heating and pressing a thermo-reversible optical material such as glass or the like within a molding die is known. This technique sometimes needs a lot of time to uniformly heat glass or the like due to a low thermal conductivity of the glass or the like if the glass or the like is attempted to be heated with heat conducted from a portion that makes contact with the molding die.

Therefore, Patent Document 1 discloses a technique of uniformly heating glass within a molding die by directly spraying a heated inactive gas onto the glass as auxiliary heating means.

PRIOR ART DOCUMENT

Patent Document

[Patent Document 1] Japanese Laid-Open Patent Publication No. 2008-120645

SUMMARY OF THE INVENTION

An object of the present invention is to provide an optical element manufacturing technique that can improve a heating efficiency by introducing a heated inactive gas into a molding die without degrading the quality of an optical element due to a misalignment or the like of an optical material within the molding die.

A first aspect of the present invention provides an optical element manufacturing method including a first step of fixing an optical material by exerting a first weight on the optical material positioned in a cavity within a molding die, a second step of thereafter heating and softening the optical material by introducing a heated gas to an inside of the cavity, and a third step of thereafter molding an optical element by exerting a second weight larger than the first weight on the optical material within the cavity.

A second aspect of the present invention provides an optical element manufacturing apparatus including pressurization means for pressurizing a molding die, gas introduction means for enabling a heated gas to be introduced into a cavity within the molding die, and control means for controlling the gas to be introduced into the cavity after fixing an optical material by exerting, on the optical material, a first weight that is smaller than a second weight exerted when the optical material accommodated in the cavity is molded.

A third aspect of the present invention provides an optical element molding die including a cylinder, an upper die and a lower die, which are respectively inserted from both ends of the cylinder and configure a cavity between mold surfaces facing within the cylinder, a gas introduction hole formed by penetrating into a wall surface of the cylinder at a position corresponding to the cavity, a sleeve in which the cylinder is inserted, and a gas supply hole that is formed by penetrating into a wall surface of the sleeve, and opens or closes the gas introduction hole depending on whether the sleeve is displaced either linearly or rotationally in an axial direction of the sleeve.

According to the present invention, an optical element manufacturing technique that can improve a heating efficiency by introducing a heated inactive gas to an inside of a molding die without degrading the quality of an optical element due to a misalignment or the like of an optical material within the molding die can be provided.

DESCRIPTION OF THE PREFERRED EMBODIMENTS

In one aspect of embodiments, a heated gas is introduced to an inside of a cavity after a molding material is sandwiched by upper and lower dies with a weight that does not move an optical material when the heated gas is introduced to the inside of the cavity of a molding die, and does not damage the optical material.

Additionally, a gas introduction path is shut off in order not to introduce a gas such as a heated gas or a low-temperature gas in the external atmosphere of the molding die into the cavity when the weight is released, so that the molding material within the molding die is prevented from being misaligned, or a temperature within the cavity is prevented from dropping.

Namely, the optical material remains stationary at a specified position and is efficiently heated without being moved from the specified position due to a dynamic pressure or the like of the heated gas introduced to the inside of the cavity. As a result, a satisfactory optical element can be obtained.

Embodiments according to the present invention are described in detail below with reference to the drawings.

The following description of the embodiments assumes that X, Y and Z directions are those illustrated in the drawings, and also assumes that the Z direction and an X-Y plane are a vertical direction and a horizontal plane, respectively.

Additionally, like numerals are denoted with like reference numerals, and redundant explanations are omitted in the following description of the embodiments.

First Embodiment

Figure 1:
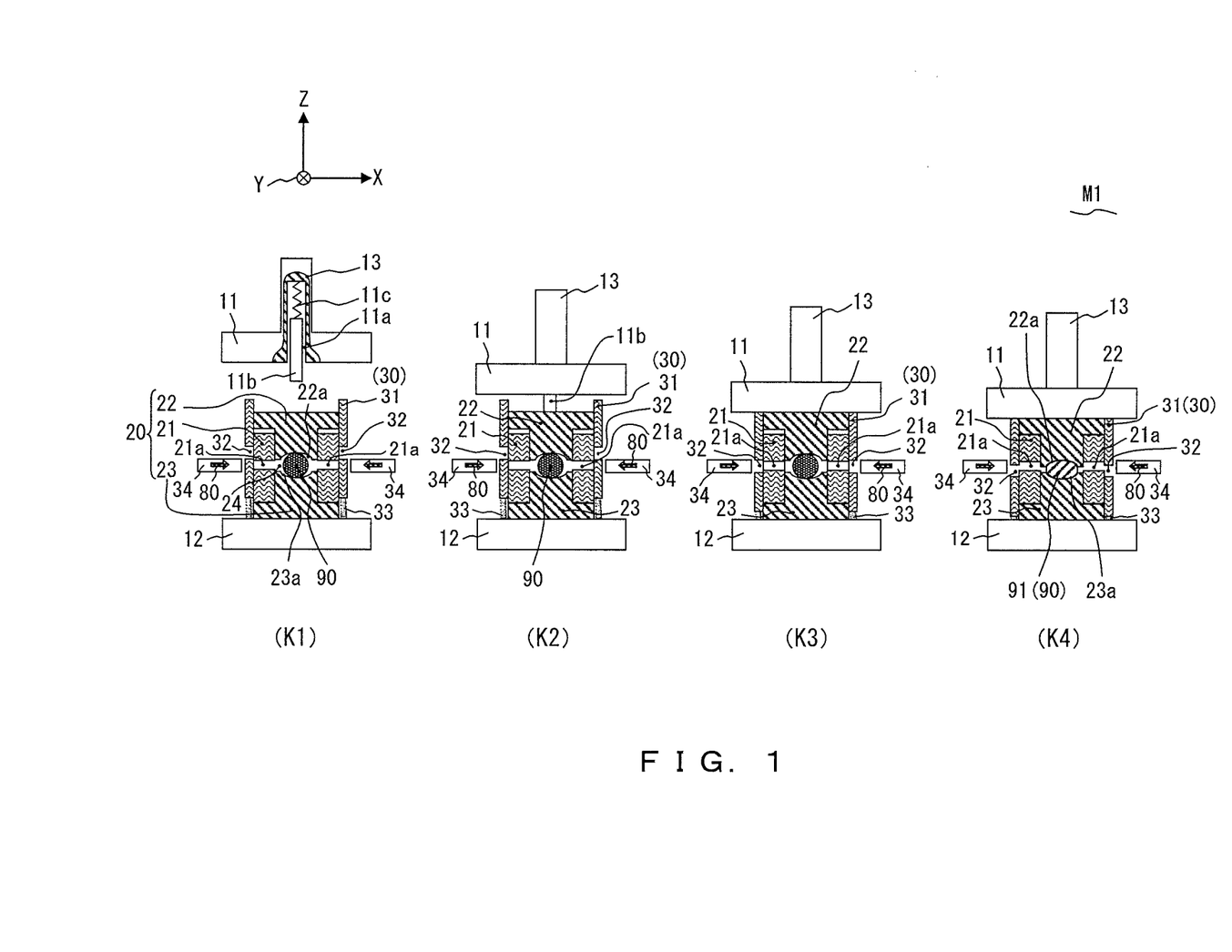
FIG. 1 is a sectional plan view illustrating one example of a configuration and actions of a manufacturing apparatus for executing an optical element manufacturing method according to an embodiment of the present invention in order of steps.

FIG. 1 is a sectional plan view illustrating one example of a configuration and actions of a manufacturing apparatus for executing an optical element manufacturing method according to an embodiment of the present invention in order of steps.

Figure 2:
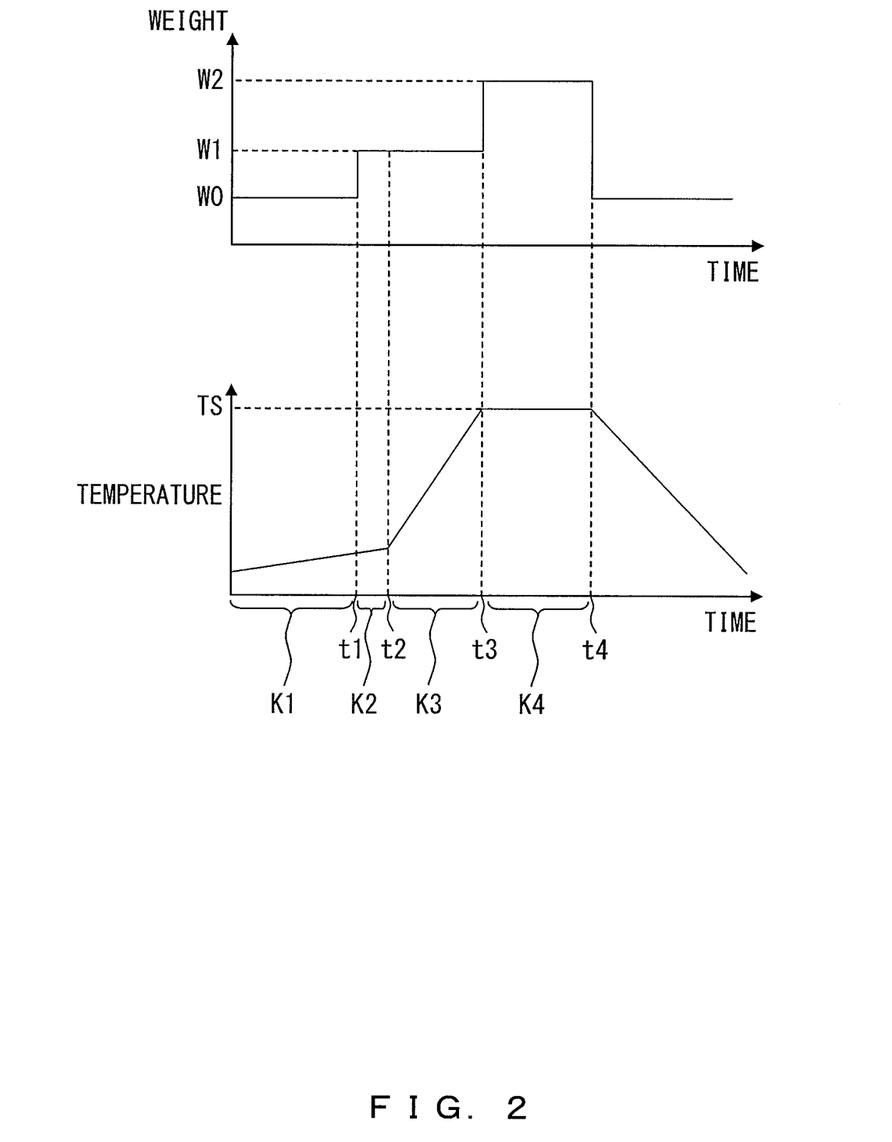
FIG. 2 is a schematic illustrating one example of actions of the manufacturing apparatus for executing the optical element manufacturing method according to the embodiment of the present invention.

FIG. 2 is a schematic illustrating one example of the actions of the manufacturing apparatus for executing the optical element manufacturing method according to the embodiment of the present invention.

The manufacturing apparatus M1 according to this embodiment includes an upper plate 11 (pressurization means) and a lower plate 12, which face each other in the vertical direction, and an upper axis 13 for driving the upper plate 11 in the vertical direction.

Within the upper plate 11 and the lower plate 12, a heater not illustrated is buried. With the heater, each of the plates can be heated to a specified temperature.

On the lower plate 12, a molding die 20 is placed. At a circumference of the molding die 20, a control mechanism 30 (control means) to be described later is provided.

The molding die 20 includes a cylinder 21, and an upper die 22 and a lower die 23, which are inserted from top and bottom openings of the cylinder 21 so that they face each other.

Within the cylinder 21, a cavity 24 is formed between a mold surface 22a of the facing upper die 22 and a mold surface 23a of the lower die 23. The cavity 24 internally accommodates an optical material 90 such as a glass preform or the like that is spherically molded in advance.

A wall surface of the cylinder 21 is provided with a plurality of gas introduction holes 21a (gas introduction means) (through holes) are formed at positions communicated with the inside of the cavity 24 by penetrating into positions symmetrical with respect to the Z axis.

In the case of the manufacturing apparatus M1 according to this embodiment, a control mechanism 30 including a sleeve 31 (first cylinder) in which the cylinder 21 is coaxially inserted, a plurality of gas nozzles 34 that are open and face the gas introduction holes 21a of the cylinder 21, and an axial direction driving spring 33 that is provided at the bottom end of the sleeve 31 and continuously presses the sleeve 31 in an upward direction where the sleeve 31 protrudes from the top end of the upper die 22 is arranged at the circumference of the molding die 20. In FIG. 1, only the sleeve 31 is denoted with the reference numeral (30) for the sake of convenience.

Note that the bottom end itself of the sleeve 31 may be configured to function as the axial direction driving spring 33 by forming a helical slit at the bottom end of the sleeve 31.

The gas nozzles 34 are configured, for example, with a torch heater. The gas nozzles 34 are configured to continuously emit, for example, an inactive gas 80 as a gas that is heated to a specified temperature to the gas introduction holes 21a of the molding die 20.

Additionally, the sleeve 31 has a plurality of gas supply holes 32 (first penetration holes) that are open at the same positions as the gas introduction holes 21a in the rotational direction of the Z axis.

The gas supply holes 32 move higher than the height position of the gas introduction holes 21a in a state where the sleeve 31 is protruded upward by the axial direction driving spring 33, so that the communication state between the gas introduction holes 21a and the gas nozzles 34 is shut off by the sleeve 31.

Additionally, when the top end of the sleeve 31, which is pressed downward by the upper plate 11, moves up to a position that matches the top end surface of the upper die 22, the gas supply holes 32 reach the same height as the gas introduction holes 21a of the cylinder 21. As a result, the gas nozzles 34 communicate with the gas introduction holes 21a, so that the heated inactive gas 80 is introduced to the inside of the cavity 24.

Namely, the control mechanism 30 according to this embodiment implements actions for switching a shutoff and a communication between the gas introduction holes 21a and the gas nozzles 34 by moving the sleeve 31 provided with the gas supply holes 32 upward or downward in conjunction with up and down movements of the upper plate 11.

In the case of this embodiment, a pin hole 11a is provided to penetrate into the upper plate 11 and the upper axis 13 in the axial direction at a center of the upper plate 11. The pin hole 11a internally accommodates a pressurization pin 11b (pressurization means) that protrudes from the bottom surface of the upper plate 11.

The top end of the pressurization pin 11b is fixed to the ceiling of the pin hole 11a via a pressurization spring 11c.

When the upper plate 11 is moved downward by the upper axis 13, the bottom end of the pressurization pin 11b initially touches the upper die 22 of the molding die 20 before the upper plate 11 touches the top end of the sleeve 31. As a result, a load (fixing weight W1 (first weight) that will be described later and fixes the optical material 90 by sandwiching the optical material 90 between the upper die 22 and the lower die 23) is generated in a direction where the upper die 22 is made to approach the lower die 23.

Then, the pressurization pin 11b is pressed into the pin hole 11a as the upper plate 11 descends. In a state where the upper plate 11 touches the upper die 22, the pressurization pin 11b is completely pressed into the pin hole 11a.

As described above, in this embodiment, the pressurization pin 11b touches the upper die 22 before the descending upper plate 11 touches the sleeve 31, so that the fixing weight W1 is generated.

Accordingly, the fixing weight W1 can be set to a desired value by suitably setting a spring constant and a length of the pressurization spring 11c that supports the pressurization pin 11b.

In the case of this embodiment, settings are made such that the pressurization pin 11b exerts a specified fixing weight W1 on the upper die 22 at a height immediately before the gas supply holes 32 match the position of the gas introduction holes 21a when the sleeve 31 is pressed down by the descending upper plate 11, namely, at a position immediately before the inactive gas 80 is introduced from the gas nozzles 34 into the cavity 24.

One example of the actions of this embodiment is described below with reference to FIGS. 1 and 2.

Initially, the molding die 20 which internally accommodates the optical material 90 and to which the sleeve 31 is attached is placed on the lower plate 12 that is heated to a specified molding temperature (preparatory step K1).

At this time, only an upper die self weight W0 that is a self weight of the upper die 22 exerts on the optical material 90 within the molding die 20. Moreover, the optical material 90 is aligned so that its central position matches a central position of the cavity 24, namely, a central position (optical axis position) of the mold surface 22a and the mold surface 23a.

Additionally, the top end of the sleeve 31 protrudes from the top end surface of the upper die 22, and the gas supply holes 32 move to a position shifted upward from the gas introduction holes 21a. Accordingly, the cavity 24 is shut off from the gas nozzles 34 and the external atmosphere.

As described above, the gas introduction holes 21a are shut off by the sleeve 31 in the state where no load is externally exerted. Accordingly, the optical material 90 located at the specified central position of the cavity 24 within the molding die 20 is not misaligned by an influence such as the external atmosphere or the like.

Then, when the upper plate 11 that is heated to the specified molding temperature is moved down by the upper axis 13, the pressurization pin 11b that protrudes from the upper plate 11 initially touches the top end of the upper die 22, and the upper plate 11 descends to a position immediately before touching the sleeve 31. As a result, the fixing weight W1 is exerted on the upper die 22 (fixed timing t1) to fix the optical material 90 (fixing step K2 (first step)).

Additionally, when the upper plate 11 touches the top end surface of the upper die 22 by moving the upper plate 11 downward to press the sleeve 31, the gas supply holes 32 reach the positions of the gas introduction holes 21a (gas introduction start timing t2). As a result, the inactive gas 80 that is emitted from the gas nozzles 34 and heated to the specified temperature is sprayed onto the optical material 90 within the cavity 24, so that the optical material 90 starts to be heated (heating step K3 (second step)).

At this time, the optical material 90 is also heated by thermal conduction and a radiation heat from the upper plate 11 and the lower plate 12.

In the case of this embodiment, the optical material 90 is fixed by the fixing weight W1 immediately before the inactive gas 80 is introduced from the gas nozzles 34, thereby securely preventing the optical material 90 from being misaligned from a specified central position of the cavity 24.

When the optical material 90 reaches a specified molding temperature TS, the optical material 90 starts to be molded by further moving the upper plate 11 downward by the upper axis 13, and by pressing the upper die 22 with a molding weight W2 (second weight) (molding press start timing t3). Then, the mold surface 22a of the upper die 22 and the mold surface 23a of the lower die 23 are transferred to the optical material 90, so that an optical element 91 is obtained (press molding step K4 (third step)).

At the time of this molding, the optical material 90 is aligned at the central position with high precision without being misaligned within the cavity 24 in the case of this embodiment. As a result, the optical material 90 deforms symmetrically with respect to the optical axis, whereby the optical element 91 of high quality having non-biased optical performance around the optical axis can be obtained.

Thereafter, the molding weight W2 exerted by the upper plate 11 is released, and the molding die 20 starts to be cooled down (molding press end timing t4). At this time, when the upper plate 11 moves up to separate from the sleeve 31, the sleeve 31 ascends, and the gas supply holes 32 move to a position shifted upward from the gas introduction holes 21a. In this way, the cavity 24 is restored to an externally shut state.

When the temperature of the molding die 20 drops to a specified temperature, the molding die 20 is disassembled to take out the optical element 91.

Note that a desired mold clamping weight may be exerted on the upper die 22 at the start of cooling down if needed.

As described above, in the case of the manufacturing apparatus M1 according to this embodiment, the sleeve 31 having the gas supply holes 32 for controlling opening/closing of the gas introduction holes 21a of the molding die 20 is moved upward and downward in conjunction with the upper plate 11, As a result, the heated inactive gas 80 is introduced into the cavity 24 after the specified fixing weight W1 is exerted to fix the optical material 90.

Accordingly, the heated inactive gas 80 is introduced to the inside of the cavity 24 and sprayed onto the optical material 90, whereby the optical material 90 can be uniformly heated to a molding temperature with high efficiency in a short time. Additionally, the optical material 90 is not moved despite being sprayed by the inactive gas 80, and an optical element 91 having a satisfactory optical performance can be efficiently obtained.

Here, an example of a method for deciding the fixing weight W1 and a method for supplying the inactive gas 80 from the gas nozzles 34 in this embodiment is described.

For example, the gas nozzles 34 are assumed to have a nozzle diameter ø of 1 mm to 4 mm in the case of this embodiment.

If the nozzle diameter ø of the gas nozzles 34 is too small, a flow velocity becomes too fast, and a dynamic pressure exerted on the optical material 90 onto which the inactive gas 80 is sprayed becomes high. Therefore, it is needed to fix the optical material 90 by sandwiching the material with a larger fixing weight W1.

In the meantime, if the nozzle diameter ø of the gas nozzles 34 is too large, the flow velocity becomes slow. Therefore, the optical material 90 is not fully heat-exchanged by the heated inactive gas 80.

For example, a flow quantity Q of the inactive gas 80 is assumed to be 10 L/min to 40 L/min.

If the flow quantity Q is too small, the flow velocity of the inactive gas 80 becomes slow, and the optical material 90 is not fully heat-exchanged. In contrast, if the flow quantity Q is too large, the flow velocity of the inactive gas 80 becomes too fast. Therefore, it is needed to fix the optical material 90 by sandwiching the material with a larger fixing weight W1.

One example of a method for deciding the fixing weight W1 based on a size, a shape or the like of the optical material 90 is described next.

If not a point but a surface of the optical material 90 makes contact with the mold surfaces 22a, 23a by being elastically deformed by the weight, and if the optical material 90 is shaped like a sphere, assume P: concentrated weight [N] (=fixing weight W1)
v1: Poisson ratio of the optical material 90
v2: Poisson ratio of the mold surface 22a (mold surface 23a)
E1: longitudinal elasticity modulus [MPa] of the optical material 90
E2: longitudinal elasticity modulus [MPa] of the mold surface 22a (mold surface 23a)
R1: curvature radius [mm] of the optical material 90
R2: curvature radius [mm] of the mold surface 22a (mold surface 23a) (1/R2=−1(1/R2) in a case of a concave surface, or R2=∞ in a case of a flat surface).

In this case, the contact radius α [mm] with the mold surface 22a (mold surface 23a) is represented by the following equation (1) based on Hertz's formula.

$$\alpha = 3\sqrt{\frac{\frac{3P}{4}\left(\frac{1-v_1^2}{E_1}+\frac{1-v_2^2}{E_2}\right)}{\left(\frac{1}{R_1}+\frac{1}{R_2}\right)}} \quad (1)$$

Here, the optical material 90 is not fully deformed when being heated if the contact radius α is small, or the surface of the optical material 90 cracks if the contact radius α is too large. Therefore, a satisfactorily molded product such as an optical element 91 or the like cannot be obtained.

Accordingly, it is desirable in the case of this embodiment that the contact radius α between the mold surface 22a (mold surface 23a) and the optical material 90 is, for example, 0.05 mm to 0.3 mm. Accordingly, the fixing weight W1 is set to, for example, a range from approximately 1 kgf to 50 kgf in this embodiment.

More desirably, the contact radius α is approximately 0.1 mm to 0.2 mm. In this case, the fixing weight W1 is set to, for example, a range from approximately 5 kgf to 30 kgf.

Namely, in the case of this embodiment, the fixing weight W1 by which a force that can fully fix the optical material 90 is obtained in a range where the optical material 90 is not damaged is decided according to the flow quantity Q of the heated inactive gas 80, the shape of the optical material 90 or the like.

Note that the length of time needed for the press molding step K4 may be reduced by promoting the optical material 90 to deform in the heating step K3 with an increase of the fixing weight W1 to a largest value within the range where the optical material 90 is not damaged.

Alternatively, the optical material 90 may be promoted to deform during the heating step K3 by exerting a third weight larger than the fixing weight W1 during the heating step K3 in the range where the optical material 90 is not damaged.

Second Embodiment

Figure 3:
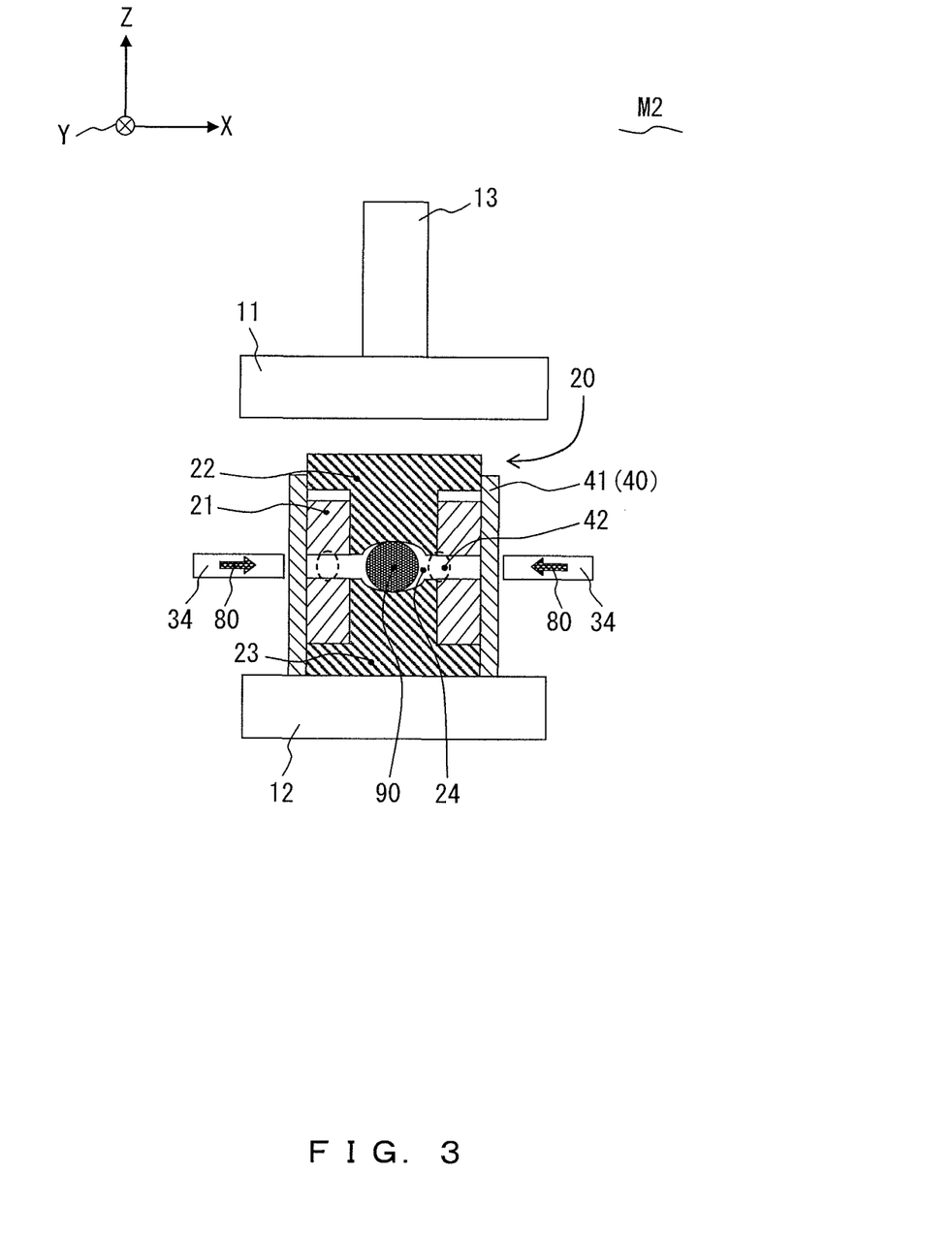
FIG. 3 is a sectional plan view illustrating an example of a configuration of a manufacturing apparatus for executing an optical element manufacturing method according to another embodiment of the present invention.
Figure 4:
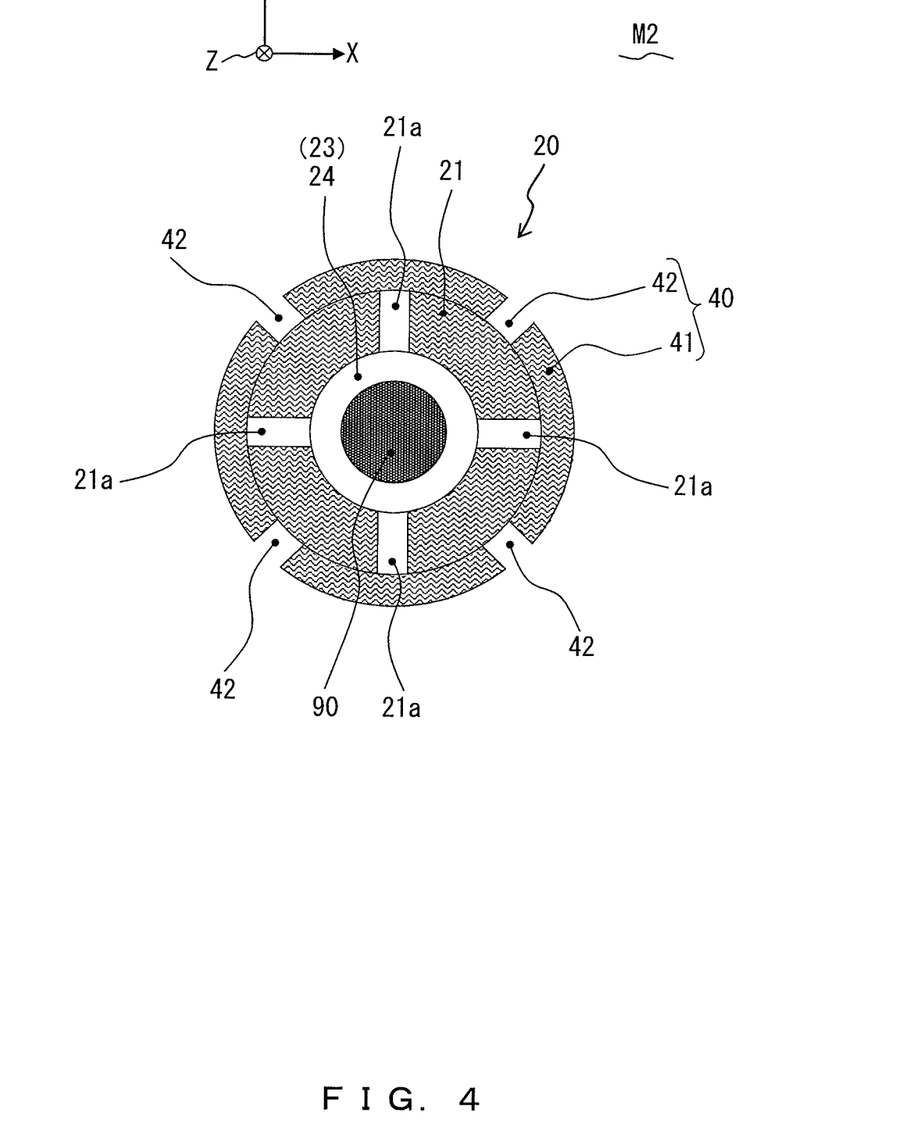
FIG. 4 is a cross-sectional view of FIG. 3.

FIG. 3 is a sectional plan view illustrating an example of a configuration of a manufacturing apparatus for executing an optical element manufacturing method according to a second embodiment of the present invention, whereas FIG. 4 is a cross-sectional view of FIG. 3.

Figure 5:
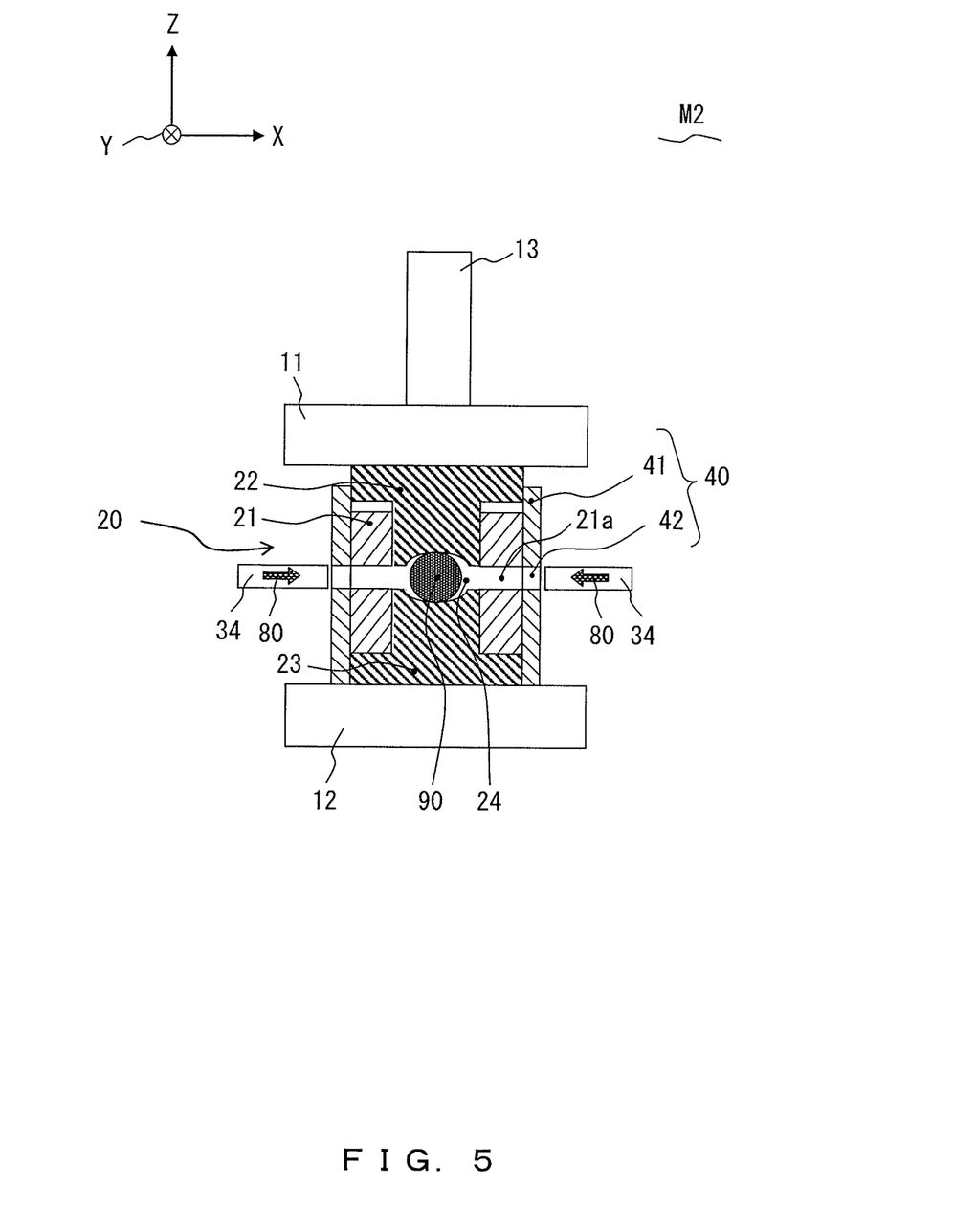
FIG. 5 is a sectional plan view illustrating one example of an operational state of the manufacturing apparatus for executing the optical element manufacturing method according to the another embodiment of the present invention.
Figure 6:
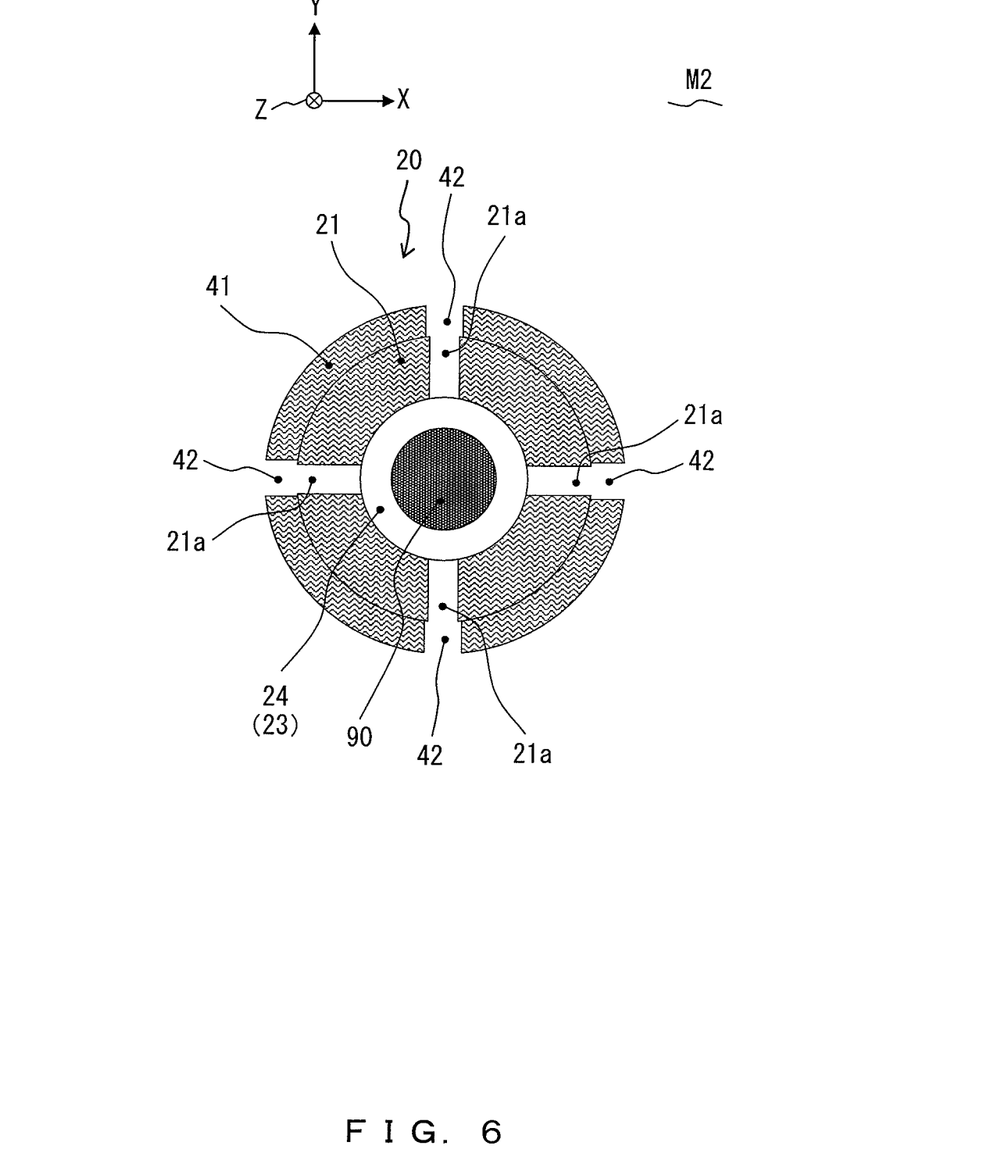
FIG. 6 is a cross-sectional view of FIG. 5.

FIG. 5 is a sectional plan view illustrating one example of an operational state of the manufacturing apparatus for executing the optical element manufacturing method according to the second embodiment of the present invention, whereas FIG. 6 is a cross-sectional view of FIG. 5.

The manufacturing apparatus M2 according to this embodiment is different from the above described manufacturing apparatus M1 in that a rotatable sleeve 41 (second cylinder) in which the cylinder 21 of the molding die 20 is coaxially inserted and which has gas supply holes 42 (second penetration holes) formed at positions of the same height and in the same circumferential direction as the gas introduction holes 21a of the cylinder 21 is used as a control mechanism 40 (control means).

In this case, in order to fully secure a stroke by the upper plate 11 at the time of press molding, the height of the rotatable sleeve 41 is set to be shorter than a distance between both end surfaces of the upper die 22 and the lower die 23 in the molding die where the optical material 90 is accommodated.

In the case of the control mechanism 40 of the manufacturing apparatus M2 according to the second embodiment, the rotatable sleeve 41 is rotated about the Z axis by a rotational mechanism not illustrated in conjunction with up and down movements of the upper plate 11, thereby controlling a position where the gas introduction holes 21a of the cylinder 21 and the gas supply holes 42 of the rotatable sleeve 41 match, and a position where the gas supply holes 42 shift from the gas introduction holes 21a. In this way, whether or not to introduce the inactive gas 80 from the gas nozzles 34 into the cavity 24 of the molding die 20 is controlled.

Namely, in a standby state before the molding, the rotatable sleeve 41 is rotated to the position illustrated in FIGS. 3 and 4 to shut off the gas introduction holes 21a, thereby preventing the optical material 90 from being misaligned by the external atmosphere or the like.

Then, in a state where the upper plate 11 descends and touches the top end surface of the upper die 22 and the optical material 90 is fixed between the upper die 22 and the lower die by exerting a specified fixing weight W1 on the upper die 22, the rotatable sleeve 41 is rotated to a position where the gas supply holes 42 match the gas introduction holes 21a as illustrated in FIGS. 5 and 6. As a result, the heated inactive gas 80 is introduced from the gas nozzles 34 into the cavity 24 via the gas supply holes 42 and the gas introduction holes 21a, and the gas is sprayed onto the optical material 90, so that the optical material 90 is heated.

Additionally, when the weight exerted by the upper plate 11 is released, the rotatable sleeve 41 is again rotated to make the positions of the gas introduction holes 21a and the gas supply holes 42 mismatch, thereby shutting off the introduction path of the inactive gas 80 into the cavity 24.

As described above, also in the case of the manufacturing apparatus M2 according to this embodiment, the optical material 90 can be securely prevented from moving from a specified position when the optical material 90 positioned within the cavity 24 is heated by being sprayed by the inactive gas 80 having a high temperature. Consequently, effects similar to those of the above described first embodiment can be achieved.

Furthermore, in the case of the manufacturing apparatus M2 according to the second embodiment, the top end portion of the rotatable sleeve 41 does not protrude above the upper die 22 of the molding die 20. Accordingly, the second embodiment has an advantage such that the fixing weight W1 can be exerted by a press operation of the upper plate 11 itself without providing a member such as the pressurization pin 11b or the like on the upper plate 11.

Third Embodiment

Figure 7:
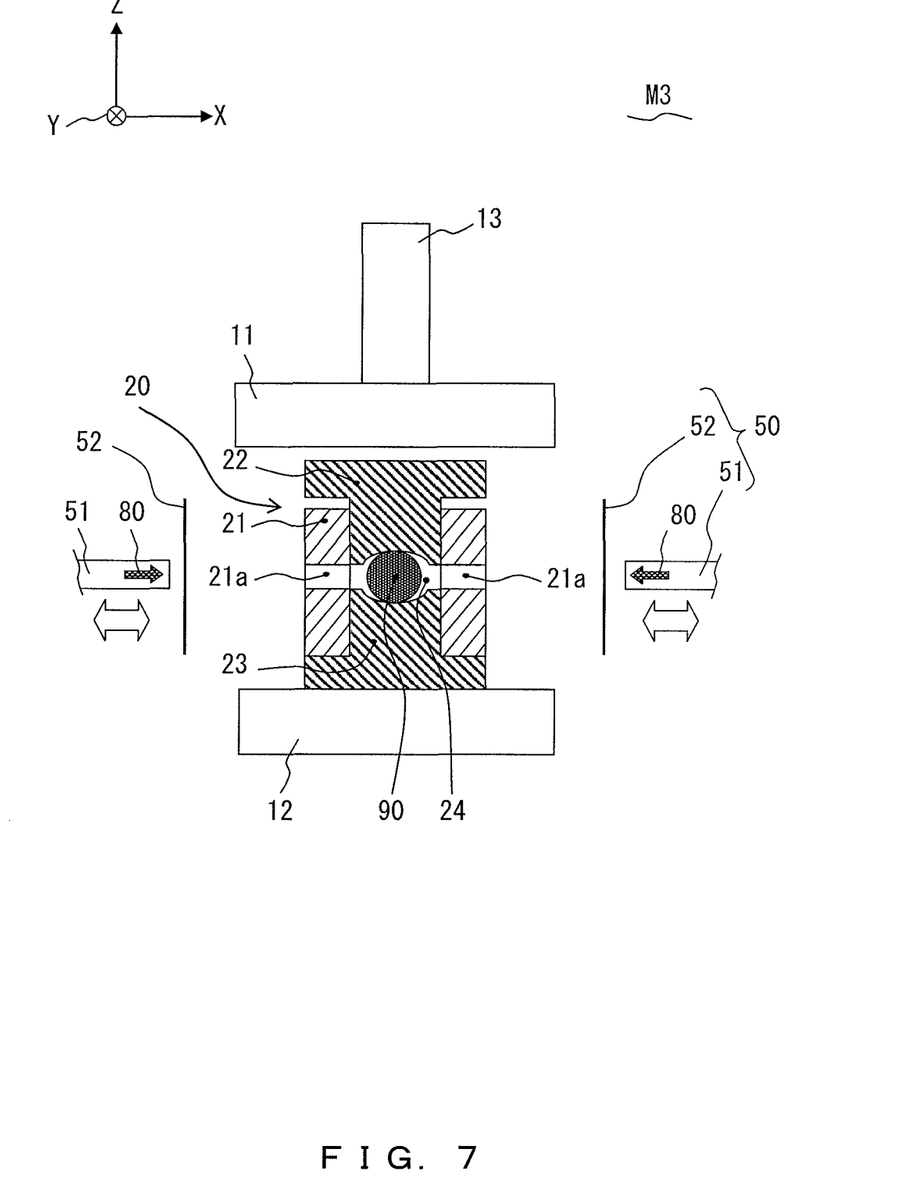
FIG. 7 is a sectional plan view illustrating an example of a configuration and actions of a manufacturing apparatus for executing an optical element manufacturing method according to a further embodiment of the present invention.
Figure 8:
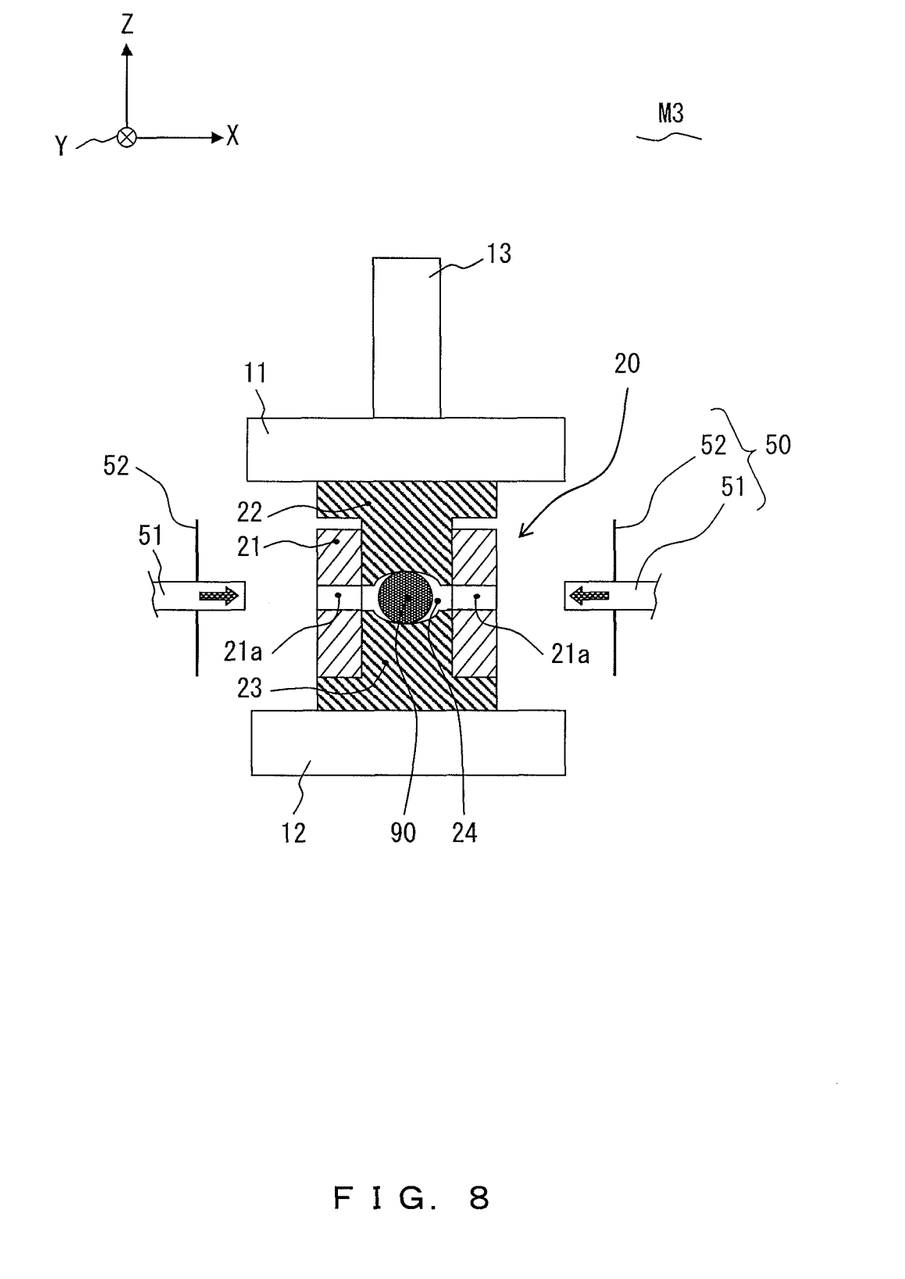
FIG. 8 is a sectional plan view illustrating an example of a configuration and actions of the manufacturing apparatus for executing the optical element manufacturing method according to the further embodiment of the present invention.

FIGS. 7 and 8 are sectional plan views illustrating an example of a configuration and actions of a manufacturing apparatus for executing an optical element manufacturing method according to a third embodiment of the present invention.

The manufacturing apparatus M3 according to the third embodiment is different from the above described first embodiment in that a control mechanism 50 (control means) composed of movable gas nozzles 51 and a movable shutoff plate 52 is provided at a circumference of a space, in which the molding die 20 is arranged, between the upper plate 11 and the lower plate 12.

Namely, in the case of this manufacturing apparatus M3, by being supported by a driving mechanism not illustrated, the movable gas nozzles 51 of the control mechanism 50 are displaced between a position for coaxially facing and approaching the gas introduction holes 21a of the cylinder 21 in the molding die 20 and a position separate from the gas introduction holes 21a.

These movable gas nozzles 51 are configured, for example, with a torch heater, and continuously emit an inactive gas 80 that is heated to a specified molding temperature.

Additionally, the movable shutoff plate 52 that can shut off the inactive gas 80 emitted from the movable gas nozzles 51 to the gas introduction holes 21a by being displaced in the Y direction vertical to the paper sheets of FIGS. 7 and 8 is arranged on the course of the displacement of the movable gas nozzles 51.

In the case of this manufacturing apparatus M3, when the fixing weight W1 is not exerted by the upper plate 11 on the upper die 22 and the optical material 90 (the state illustrated in FIG. 7), the movable gas nozzles 51 are retracted to a position separate from the gas introduction holes 21a, and the movable shutoff plate 52 advances between the retracted movable gas nozzles 51 and the gas introduction holes 21a of the cylinder 21. In this way, the inactive gas 80 emitted from the movable gas nozzles 51 to the gas introduction holes 21a is shut off.

As a result, the optical material 90 within the cavity 24 is prevented from being misaligned from a specified position before the upper plate 11 touches the upper die 22 of the molding die 20 placed on the lower plate 12.

Thereafter, at a time point when the upper plate 11 is moved down by the upper axis 13 and touches the upper die 22 to exert the fixing weight W1, the movable shutoff plate 52 is retracted from the moving path of the movable gas nozzles 51. At the same time, the movable gas nozzles 51 are made to approach the gas introduction holes 21a, the inactive gas 80 that is heated to the specified temperature is sprayed onto the optical material 90 within the cavity 24 from the movable gas nozzles 51, and the optical material 90 is heated to the molding temperature. Thereafter, press molding for pressing the upper die 22 with the molding weight W2 by further moving down the upper plate 11 is performed.

When the upper plate 11 separates from the upper die 22 after the press molding, the movable gas nozzles 51 are retracted and the movable shutoff plate 52 advances to shut off the inactive gas 80 emitted from the movable gas nozzles 51.

As described above, also in the case of the third embodiment, the inactive gas 80 that is heated to the specified temperature can be sprayed onto the optical material 90 within the cavity 24 in the state where the optical material 90 is fixed by exerting the specified fixing weight W1 on the upper die 22 from the upper plate 11. As a result, the optical material 90 can be uniformly heated to a specified molding temperature with high efficiently in a short time, and the optical material 90 can be securely prevented from being misaligned when the inactive gas 80 is sprayed onto the optical material 90, whereby an optical element 91 of high quality can be obtained.

Additionally, the manufacturing apparatus M3 according to the third embodiment also has an advantage such that there is no need to arrange a special component on the sides of the upper plate 11 and the molding die 20, leading to simplification of a configuration of the molding die 20.

Figure 9:
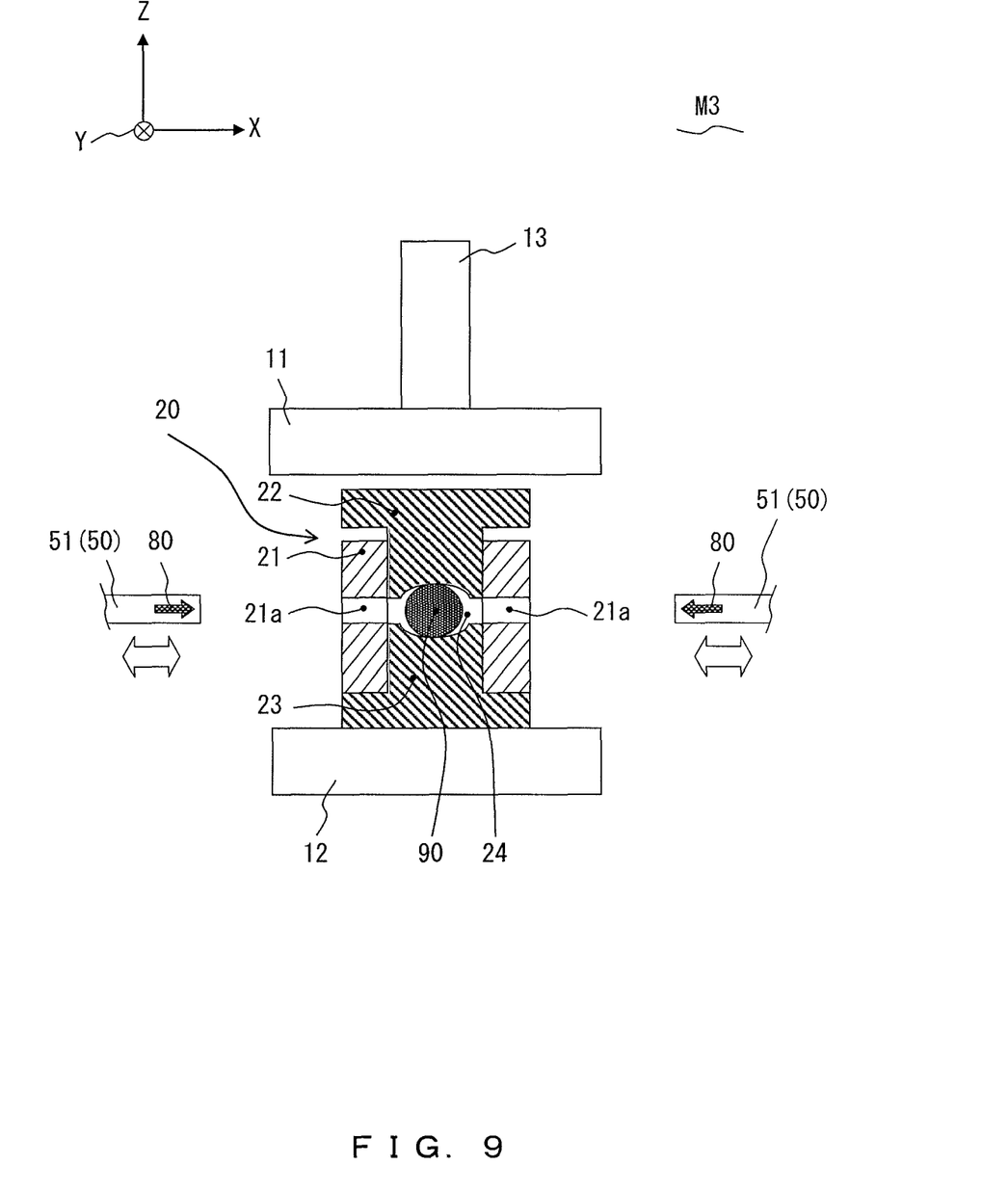
FIG. 9 is a sectional plan view illustrating a modification example of the configuration and the actions of the manufacturing apparatus for executing the optical element manufacturing method according to the further embodiment of the present invention.

The above described example refers to the case where the inactive gas 80 is shut off by using the movable shutoff plate 52. However, introduction of the inactive gas 80 into the cavity 24 can be substantially shut off, for example, by sufficiently separating the movable gas nozzles 51 from the gas introduction holes 21a as illustrated in FIG. 9 without providing the movable shutoff plate 52. In either case, the flow quantity of the inactive gas 80 introduced to the inside of the cavity 24 in the above described first step (fixing step K2) can be made smaller than that in the above described second step (heating step K3) (including also a case where the flow quantity of the inactive gas 80 introduced to the inside of the cavity 24 in the first step is 0).

Fourth Embodiment

Figure 10:
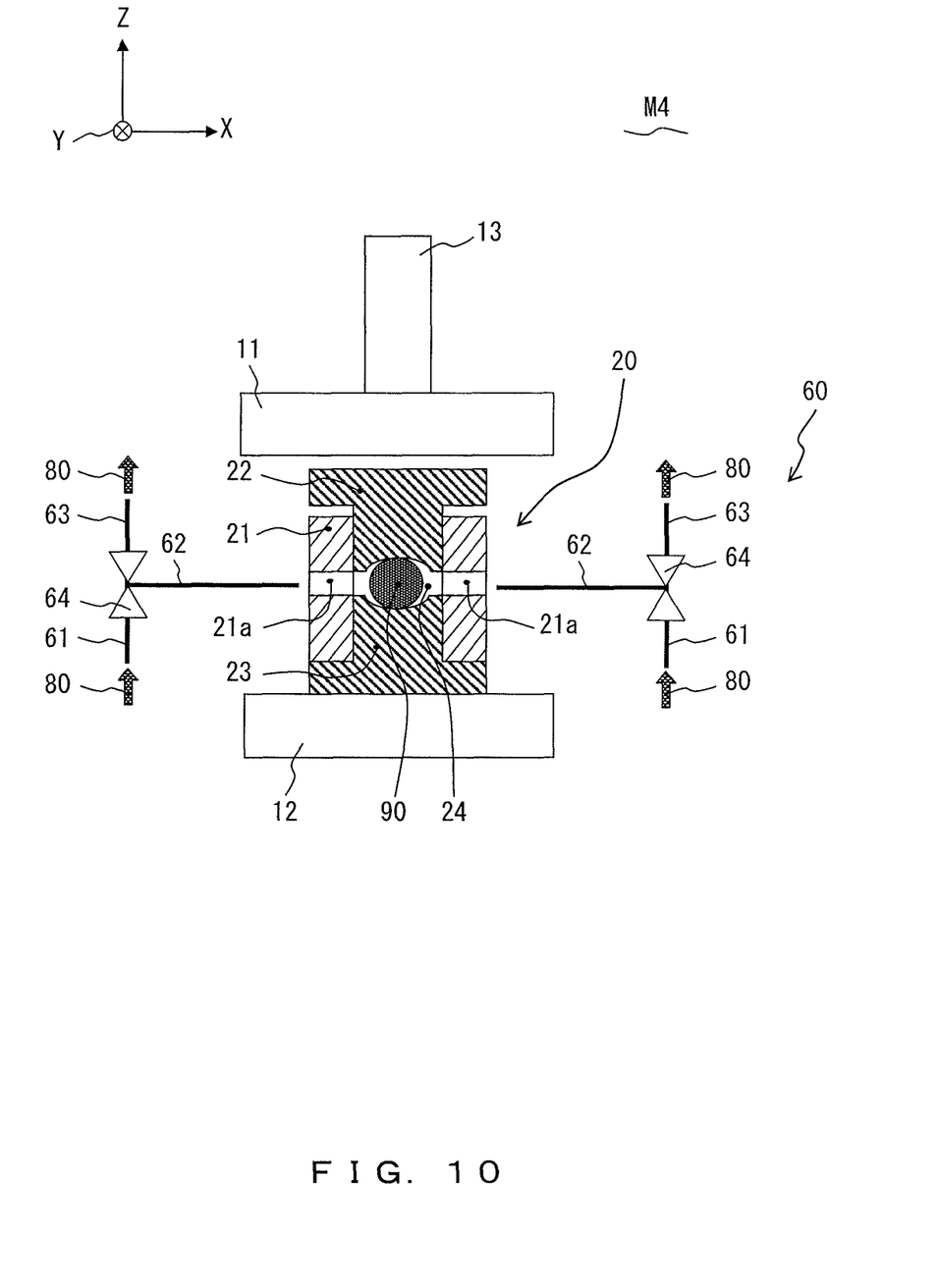
FIG. 10 is a sectional plan view illustrating an example of a configuration and actions of a manufacturing apparatus for executing an optical element manufacturing method according to a still further embodiment of the present invention.
Figure 11:
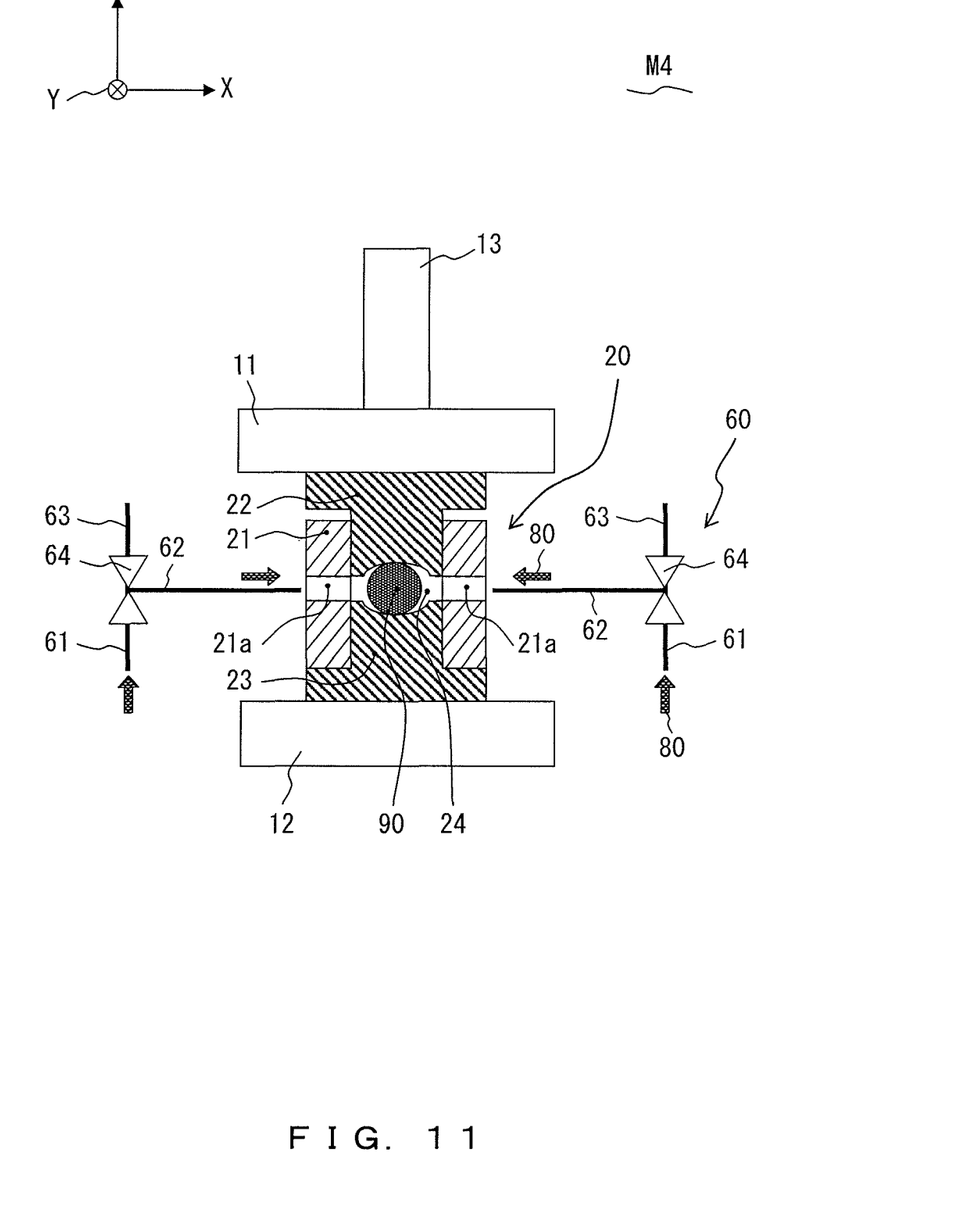
FIG. 11 is a sectional plan view illustrating an example of a configuration and actions of the manufacturing apparatus

FIGS. 10 and 11 are sectional plan views illustrating an example of a configuration and actions of a manufacturing apparatus for executing an optical element manufacturing method according to a fourth embodiment of the present invention.

The manufacturing apparatus M4 according to the fourth embodiment is different from the above described third embodiment in that a control mechanism 60 (control means) composed of gas supply tubes 61, gas supply nozzles 62, gas bypass nozzles 63 and switch valves 64 is arranged as a replacement for the above described control mechanism 50.

Namely, in the case of the manufacturing apparatus M4 according to this embodiment, the gas supply tubes 61 are configured, for example, with a torch heater, and configured to continuously supply an inactive gas 80 that is heated to a specified molding temperature to the gas supply nozzles 62 or the gas bypass nozzles 63 via the switch valves 64.

The gas supply nozzles 62 are fixedly arranged at positions coaxially facing the gas introduction holes 21a adjacently to the gas introduction holes 21a of the cylinder 21 in the molding die 20 placed on the lower plate 12.

In other words, the molding die 20 is aligned so that the gas introduction holes 21a of the cylinder 21 match the tips of the gas supply nozzles 62 when the molding die 20 is placed on the lower plate 12.

Additionally, the gas bypass nozzles 63 are provided to be open in a direction that deviates from the molding die 20 placed on the lower plate 12, and to emit the heated inactive gas 80 in a direction where the molding die 20 is not sprayed.

Namely, in the case of this embodiment, the heated inactive gas 80 is supplied from the gas supply tubes 61 to the gas bypass nozzles 63 by the switch valves 64 as illustrated in FIG. 10 if the fixing weight W1 is not exerted on the molding die 20 in the control mechanism 60. Moreover, the inactive gas 80 is led to a direction that deviates from the molding die 20.

In the meantime, upon detecting that the optical material 90 is sandwiched between the upper die 22 and the lower die 23 with a predetermined force by exerting the specified fixing weight W1 on the upper die 22 of the molding die 20 from the upper plate 11 at a stage before the molding, the switch valves 64 activate to lead the heated inactive gas 80 to the cavity 24 via the gas supply nozzles 62 facing towards the gas introduction holes 21*a* as illustrated in FIG. 11, so that the optical material 90 is heated.

When the weight exerted on the upper plate 11 is released, the switch valves 64 reactivate to lead the heated inactive gas 80 in a direction that deviates from the molding die 20 via the gas bypass nozzles 63.

Also in the case of this fourth embodiment, effects similar to those of the above described third embodiment can be obtained, and at the same time, the supply direction of the heated inactive gas 80 to the gas supply tube 61, the gas supply nozzles 62 and the gas bypass nozzles 63, which are installed stationarily, is only switched by the switch valves 64 in conjunction with up and down movements of the upper plate 11. Accordingly, the fourth embodiment has an advantage such that a movable part other than the switch valve 64 is not needed, leading to simplification of a configuration.

As described above, according to the embodiments of the present invention, a heating efficiency achieved by introducing the heated inactive gas 80 to the inside of the molding die 20 can be improved without degrading the quality of the optical element 91 due to a misalignment or the like of the optical material 90 within the molding die 20.

The present invention is not limited to the above described embodiments, and can be diversely modified within a scope that does not depart from the gist of the present invention as a matter of course.

For example, the above described embodiments refer to the configurations where the torch heater is used as the mechanism for heating the inactive gas 80, the heated inactive gas 80 is continuously supplied, the supply path of the inactive gas 80 is shut off, and the supply positions and the direction of the gas are controlled. However, the present invention is not limited to these configurations. For example, heating, and emission and supply operations themselves of the inactive gas 80 may be switched on/off in conjunction with up and down movements of the upper plate 11.

What is claimed is:

1. An optical element manufacturing method, comprising:
   placing an optical material in a cavity of a mold comprising upper and lower dies, the upper die exerting a self weight on the optical material;
   during a first period, exerting a first weight, greater than the self weight exerted by the upper die, on the optical material while the optical material is positioned in the cavity between the upper die and the lower die;
   during a second period, heating and softening the optical material by introducing a heated gas into the cavity at a first flow rate; and
   during a third time period, molding the optical material into the optical element by exerting a second weight, larger than the first weight, on the optical material while introducing the heated gas into the cavity at a second flow rate which is higher than the first flow rate;
   wherein the heated gas is introduced into the cavity during the second time period by moving a movable gas nozzle from a first position remote from the cavity to a second position closer to the cavity than the first position.

2. The optical element manufacturing method according to claim 1, wherein the gas is introduced into the cavity from a gas source located outside of the cavity via a flow path and the flow path is shut off during the first period.

3. The optical element manufacturing method according to claim 1, wherein the optical material is further deformed during the second time period by exerting a third weight, larger than the first weight, on the optical material.

4. The optical element manufacturing method according to claim 1, wherein the movable gas nozzle is located in the first position during the first time period.

* * * * *